United States Patent
de Perthuis et al.

(10) Patent No.: US 12,375,274 B2
(45) Date of Patent: Jul. 29, 2025

(54) COMMUNICATION DEVICES AND OPERATING METHODS

(71) Applicant: NXP B.V., Eindhoven (NL)

(72) Inventors: Hugues Jean Marie de Perthuis, Garcelles (FR); Stefan Lemsitzer, Stainz (AT); Srivathsa Masthi Parthasarathi, Bangalore (IN)

(73) Assignee: NXP B.V., Eindhoven (NL)

( * ) Notice: Subject to any disclaimer, the term of this patent is extended or adjusted under 35 U.S.C. 154(b) by 290 days.

(21) Appl. No.: 17/663,740

(22) Filed: May 17, 2022

(65) Prior Publication Data
US 2022/0400008 A1    Dec. 15, 2022

(30) Foreign Application Priority Data
Jun. 9, 2021   (EP) .................................... 21305783

(51) Int. Cl.
*H04L 9/00*  (2022.01)
*H04L 9/08*  (2006.01)
*H04L 9/14*  (2006.01)

(52) U.S. Cl.
CPC .............. *H04L 9/14* (2013.01); *H04L 9/0819* (2013.01)

(58) Field of Classification Search
CPC ..... H04L 9/14; H04L 9/0819; H04L 2209/84; H04L 9/002; H04L 9/005; H04L 9/3247; H04L 9/0816; H04L 2209/80; G01S 7/006; G01S 13/765; H04W 12/03; H04W 12/041; H04W 12/06; H04W 12/108

See application file for complete search history.

(56) References Cited

U.S. PATENT DOCUMENTS

| | | | |
|---|---|---|---|
| 10,326,797 B1 * | 6/2019 | Murray | H04L 9/0825 |
| 11,102,000 B2 | 8/2021 | De Perthuis et al. | |
| 11,991,527 B2 * | 5/2024 | Jung | H04W 12/047 |
| 2010/0146277 A1 * | 6/2010 | Mochizuki | H04L 9/083 380/279 |
| 2012/0011569 A1 * | 1/2012 | Chou | H04W 12/106 726/4 |
| 2014/0133656 A1 * | 5/2014 | Wurster | H04W 4/023 380/270 |

(Continued)

FOREIGN PATENT DOCUMENTS

EP    3681046 A1    7/2020

*Primary Examiner* — Ghazal B Shehni

(57) ABSTRACT

A communication device is provided, comprising: an ultra-wideband device configured to establish a communication session with an external communication device; a secure element configured to generate a session key for use in said communication session and an authentication key derived from said session key; a processing unit configured to execute an application; wherein the secure element is further configured to transfer the session key and the authentication key to the UWB device; wherein the UWB device is configured to add, upon or after receiving data for use by said application, a cryptographic tag to said data; wherein the processing unit is configured to receive said data and the cryptographic tag, and to forward said data and cryptographic tag to the secure element; wherein the secure element is configured to verify said cryptographic tag and to return, upon or after a positive verification of the cryptographic tag, a signed confirmation.

15 Claims, 6 Drawing Sheets

(56) References Cited

U.S. PATENT DOCUMENTS

| | | | |
|---|---|---|---|
| 2018/0254910 A1* | 9/2018 | Dutz | H04W 12/0431 |
| 2019/0116619 A1* | 4/2019 | Hauck | H04W 76/10 |
| 2020/0084625 A1* | 3/2020 | Kosugi | H04W 12/033 |
| 2020/0228331 A1* | 7/2020 | de Perthuis | H04L 9/0872 |
| 2021/0360395 A1* | 11/2021 | Lemsitzer | H04W 4/06 |
| 2022/0385332 A1* | 12/2022 | Koo | H04L 61/5038 |

* cited by examiner

COMMUNICATION DEVICES AND OPERATING METHODS

CROSS-REFERENCE TO RELATED APPLICATIONS

This application claims priority under 35 U.S.C. § 119 to European Patent Application No. 21305783.9, filed on Jun. 9, 2021, the contents of which are incorporated by reference herein.

TECHNICAL FIELD

The present disclosure relates to communication devices. Furthermore, the present disclosure relates to corresponding methods of operating a communication device, and to computer programs for carrying out said methods.

BACKGROUND

Ultra-wideband (UWB) is a technology that uses a high signal bandwidth, in particular for transmitting digital data over a wide spectrum of frequency bands with very low power. For example, UWB signals of at least 500 MHz wide are allowed by spectrum regulators in the 3.1-10.6 GHz frequency spectrum. In particular, UWB technology may use very short pulse signals and is potentially capable of supporting high data rates. The UWB technology enables a high data throughput for communication devices and a high precision for the localization of devices. In particular, UWB technology may be used for so-called ranging operations, i.e., for determining the distance between communicating devices.

SUMMARY

In accordance with a first aspect of the present disclosure, a communication device is provided, comprising: an ultra-wideband, UWB, device configured to establish a communication session with an external communication device; a secure element configured to generate at least one session key for use in said communication session and at least one authentication key derived from said session key; a processing unit configured to execute at least one application; wherein the secure element is further configured to transfer the session key and the authentication key to the UWB device; wherein the UWB device is configured to add, upon or after receiving data for use by said application, a cryptographic tag to said data; wherein the processing unit is configured to receive said data and the cryptographic tag added thereto, and to forward said data and cryptographic tag to the secure element; wherein the secure element is configured to verify said cryptographic tag and to return, upon or after a positive verification of the cryptographic tag, a signed confirmation to the processing unit.

In one or more embodiments, the UWB device is configured to generate said cryptographic tag using the authentication key received from the secure element.

In one or more embodiments, the UWB device is configured to generate the cryptographic tag by performing a cipher-based message authentication code (CMAC) operation on the data, wherein said authentication key is used as input for the CMAC operation, or by performing a message authentication code operation based on hash function (HMAC) on the data, wherein said authentication key is used as input for the HMAC operation.

In one or more embodiments, the UWB device is configured to generate the cryptographic tag by performing a CCM without encryption operation on the data, wherein said authentication key is used as input for the CCM without encryption operation, or by performing another authenticated encryption scheme operation, wherein said authentication key is used as input for the authenticated encryption scheme operation.

In one or more embodiments, said data include one or more notifications relating to ranging operations performed during the communication session.

In one or more embodiments, the secure element is configured to sign the confirmation using a private asymmetric cryptographic key.

In one or more embodiments, the processing unit is configured to verify, using a certificate included in the confirmation, a public cryptographic key that forms a key pair with the private cryptographic key.

In one or more embodiments, the processing unit is configured to send one or more randomly generated tokens to the UWB device, and the UWB device is configured to add said tokens to the data and to generate the cryptographic tag based on the data and said tokens.

In accordance with a second aspect of the present disclosure, a communication device is provided, comprising: an ultra-wideband, UWB, device configured to establish a communication session with an external communication device; a secure element configured to generate at least one session key for use in said communication session and at least one authentication key derived from said session key; a processing unit configured to execute at least one application; wherein the secure element is further configured to transfer the session key and the authentication key to the UWB device; wherein the secure element is further configured to transfer the authentication key to the processing unit; wherein the UWB device is configured to add, upon or after receiving data for use by said application, a cryptographic tag to said data; wherein the processing unit is configured to receive said data and the cryptographic tag added thereto, and to verify said cryptographic key using the authentication key received from the secure element.

In one or more embodiments, the secure element is configured to transfer the authentication key to the processing unit in encrypted form, such that the confidentiality, integrity and authenticity of the authentication key are protected.

In accordance with a third aspect of the present disclosure, a method of operating a communication device is conceived, the communication device comprising an ultra-wideband, UWB, device for establishing a communication session with an external communication device, a secure element for generating at least one session key for use in said communication session and at least one authentication key derived from said session key, and a processing unit for executing at least one application, the method comprising: the secure element transfers the session key and the authentication key to the UWB device; the UWB device adds, upon or after receiving data for use by said application, a cryptographic tag to said data; the processing unit receives said data and the cryptographic tag added thereto, and forwards said data and cryptographic tag to the secure element; the secure element verifies said cryptographic tag and returns, upon or after a positive verification of the cryptographic tag, a signed confirmation to the processing unit.

In one or more embodiments, the UWB device generates said cryptographic tag using the authentication key received from the secure element.

In accordance with a fourth aspect of the present disclosure, a method of operating a communication device is conceived, the communication device comprising an ultra-wideband, UWB, device for establishing a communication session with an external communication device, a secure element for generating at least one session key for use in said communication session and at least one authentication key derived from said session key, and a processing unit for executing at least one application, the method comprising: the secure element transfers the session key and the authentication key to the UWB device; the secure element transfers the authentication key to the processing unit; the UWB device adds, upon or after receiving data for use by said application, a cryptographic tag to said data; the processing unit receives said data and the cryptographic tag added thereto, and verifies said cryptographic key using the authentication key received from the secure element.

In one or more embodiments, the secure element transfers the authentication key to the processing unit in encrypted form, such that the confidentiality, integrity and authenticity of the authentication key are protected.

In accordance with a fifth aspect of the present disclosure, a computer program is provided, comprising executable instructions which, when executed by a communication device, cause said communication device to carry out methods of the kind set forth.

DESCRIPTION OF DRAWINGS

Embodiments will be described in more detail with reference to the appended drawings, in which.

DESCRIPTION OF EMBODIMENTS

Figure 1:
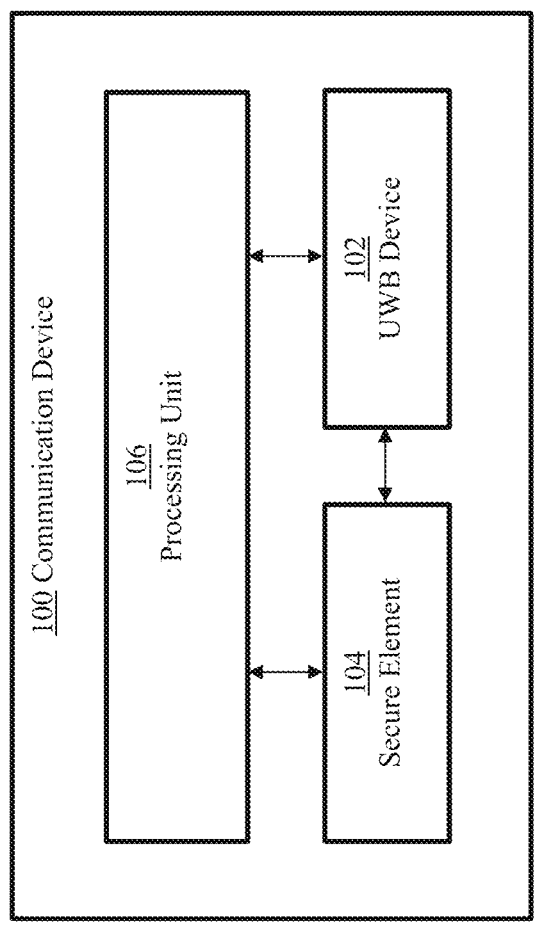
FIG. 1 shows an illustrative embodiment of a communication device.

As mentioned above, ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

UWB technology—also referred to as impulse-radio ultra-wideband (IR-UWB)—is a RF communication technology that uses pulses having a short duration for data communication. A feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range, velocity, and/or angle relative to the other smart device. In order to measure these parameters, UWB devices may operate in different modes of operation, such as a ranging mode, an angle-of-arrival (AoA) mode and a radar mode.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two phase values, and an AoA is calculated based on the PDoA. In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The skilled person will appreciate that these are non-limiting examples of how the different modes of operation can be implemented. In other words, the modes may be implemented differently, depending on the requirements imposed by the application, for example.

Thus, ranging systems may be used for measuring the range between objects, for example between one or several static reference nodes (i.e., anchors) and one tag. In this context, a tag may refer to a key fob or another mobile device carried by a user (for example, a mobile phone). Depending on the computed range, the mobile device might take some actions, for instance triggering a financial transaction in a transit system or a payment system, or opening a door. It will be appreciated that the authenticity and integrity of the ranging measurements should be protected. In particular, to protect against an attacker who might want to modify the range, the signals used for the time of flight measurements, the additional traffic used for measurement reports and the control messages are often protected using cryptographic operations based on a session key.

In a typical application based on user interactions or geofencing, an application running on a host, such as an application processor of a mobile phone, will trigger an UWB session. The application will then exchange with an anchor, which is for example included in a car or a door lock, session parameters and it will initiate a tunnel to a secure application, which is executed in a trusted execution environment (TEE) or in a secure element. It is noted that a TEE may be defined as an execution environment that has security capabilities and that meets certain security-related requirements. A TEE runs alongside but isolated from a so-called rich execution environment. In particular, the TEE protects TEE assets from general software attacks, defines rigid safeguards as to data and functions that a program can access, and resists a set of defined threats. There are multiple technologies that can be used to implement a TEE, and the level of security achieved varies accordingly. This definition of a TEE is given in the GlobalPlatform Technology TEE System Architecture specification (version 1.2), published by GlobalPlatform in November 2018 (document reference: GPD_SPE_009). Furthermore, a secure element (SE) may be defined as a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

Based on a credential exchange and internally stored root keys, the secure element (SE) will generate a session key, which will then be transferred securely to the UWB device via a secure channel. Since the root keys have a long lifetime, for example the same lifetime of the car or door lock in which they are stored, they should have a high protection level and therefore they are typically stored in an SE or in a similar device. In contrast, session keys have a shorter lifetime, so they are not protected at the same level as the root keys, and thus they can be transferred to a UWB device for the duration of a communication session (e.g., a ranging session). Nevertheless, a minimal level of security should still be attained on the side of the UWB device. According to some technical standards, such as the standards developed by the FiRa Consortium or the Car Connectivity Consortium®, a session key is typically generated at the start of a ranging session, and it is used to derive the multiple keys as required by the ranging operations.

In some applications, anchors may take a security-relevant decision autonomously when ranging is performed. For example, the anchors may open a door autonomously. In other applications, the tag (e.g., mobile phone) which communicates with the anchor or anchors may take a security-relevant decision, for example allowing a fare to be charged in a transit system or allowing a transaction to be carried out at a point of sale (POS) terminal. It is noted that the transaction itself may be carried out in the in the SE of the tag, in a TEE or in the cloud. However, the entity performing the transaction, e.g. the SE, TEE or a processing unit in the cloud, may not have a direct private connection to the UWB device (UWBD). In that case, the entity should have a way to ensure that the ranging notifications it receives from the UWBD to trigger the transaction can be trusted.

More specifically, in applications based on secure ranging, for example based on FiRa or similar protocols, a session key is securely generated in a SE and transferred via a secure channel to a UWBD, ensuring that ranging is performed securely, by relying on different keys derived from the session key. Based on a distance being reached, a transaction might occur on the device side, either in a unit such as the application processor, a TEE, SE or in the cloud. If there is no direct secure link between this unit and the UWBD, then there is a need to provide to the unit a way to authenticate the notifications which will be received regularly from the UWB device. This is necessary to prevent an attacker from triggering a transaction while the range is not correct. It is noted that the notifications may contain range information as well as other information, such as information on angles of arrival and confidence levels.

Now discussed are communication devices and corresponding methods of operating communication devices, which facilitate increasing the level of security, in the sense that data transmitted by a UWB device to an entity triggering the execution of a security-relevant application, may be authenticated. Furthermore, said communication devices and methods facilitate increasing said level of security without significantly increasing the processing load on the UWB device.

FIG. 1 shows an illustrative embodiment of a communication device 100. The communication device 100 comprises an ultra-wideband (UWB) device 102 configured to establish a communication session with an external communication device (not shown). Furthermore, the communication device 100 comprises a secure element 104 configured to generate at least one session key for use in said communication session and at least one authentication key derived from said session key. In addition, the communication device 100 comprises a processing unit 106 configured to execute at least one application. The secure element 104 is further configured to transfer the session key and the authentication key to the UWB device 102. Furthermore, the UWB device 102 is configured to add, upon or after receiving data for use by said application, a cryptographic tag to said data. Furthermore, the processing unit 106 is configured to receive said data and the cryptographic tag added thereto, and to forward said data and cryptographic tag to the secure element 104. Finally, the secure element 104 is configured to verify said cryptographic tag and to return, upon or after a positive verification of the cryptographic tag, a signed confirmation to the processing unit 106. This embodiment represents a solution to the technical problem of how to increase the level of security in a ranging system in which a UWB tag, for example a mobile device, performs ranging operations with one or more UWB anchors. In particular, this solution is based on the idea that the secure element 104 may be used as a root of trust to verify that data sent by the UWB device 102 can be trusted by, for example, the processing unit 106.

It is noted that a cryptographic tag is a short tag (i.e. code) attached to a message, proving the authenticity and integrity of a message. A cryptographic tag is typically based on a shared secret used in a CMAC or a HMAC (i.e. a message authentication code based on hash function). Compared to an asymmetric signature, a cryptographic tag can be processed much faster. Furthermore, it is noted that a cryptographic tag may also be referred to as a message authentication code. The National Institute of Standards and Technology (NIST) defines a message authentication code as an output produced by a family of cryptographic algorithms that is parameterized by a symmetric key. Each of the algorithms can act on input data of arbitrary length to produce an output value of a specified length (called the MAC of the input data). A MAC algorithm can be used to provide data origin authentication and data integrity. Furthermore, it is noted that it is known as such how a MAC can be verified, and a positive verification of a MAC (i.e., cryptographic tag) refers to a successful verification of the MAC, in the sense that the MAC is regarded as valid.

In one or more embodiments, the UWB device 102 is configured to generate the cryptographic tag using the authentication key received from the secure element 104. In this way, since the cryptographic tag is tied to a key provided by the secure element 104, the level of security may be further increased. In one or more embodiments, the UWB device 102 is configured to generate the cryptographic tag by performing a cipher-based message authentication code (CMAC) operation on the data, wherein said authentication key is used as input for the CMAC operation. This facilitates generating a cryptographic tag that enables a reliable authentication of the data. In particular, CMAC is based on symmetric cipher (e.g. AES), so if a standard already relies on such a symmetric cipher, then a CMAC is easy to implement. Another option would be HMAC, which relies on a hash function (e.g. SHA2). Alternatively, the UWB device 102 may be configured to generate the cryptographic tag by performing a CCM without encryption operation on the data, wherein said authentication key is used as input for the CCM without encryption operation. This also facilitates generating a cryptographic tag that enables a reliable authentication of the data. It is noted that CCM is used in the standards developed by the FiRa Consortium or the Car Connectivity Consortium®, so it allows easier reuse. Alternatively, another authenticated encryption scheme may be used.

In one or more embodiments, the data include one or more notifications relating to ranging operations performed during the communication session. Accordingly, notifications relating to ranging operations may be properly authenticated using a cryptographic tag of the kind set forth. In a practical implementation, the secure element 104 is configured to sign the confirmation using a private asymmetric cryptographic key. Furthermore, in a practical implementation, the processing unit 106 is configured to verify, using a certificate included in the confirmation, a public cryptographic key that forms a key pair with the aforementioned private cryptographic key. In this way, the signed confirmation may be verified. In one or more embodiments, the processing unit 106 is configured to send one or more randomly generated tokens to the UWB device 102, and the UWB device 102 is configured to add said tokens to the data and to generate the cryptographic tag based on the data and said tokens. In this way, it may be prevented that the data are delayed by an attacker.

In another illustrative embodiment of the communication device, the secure element is configured to transfer the session key and the authentication key to the UWB device, and to transfer the authentication key to the processing unit as well. In this embodiment, the processing unit is configured to receive said data and the cryptographic tag added thereto, and to verify said cryptographic key using the authentication key received from the secure element, without involving the secure element. This embodiment of the communication device, and its corresponding method of operation, are described in more detail below, with reference to FIG. 4 and FIG. 5. This embodiment represents an alternative solution to the technical problem of how to increase the level of security in a ranging system in which a UWB tag, for example a mobile device, performs ranging operations with one or more UWB anchors. In order to further increase the level of security, the secure element may be configured to transfer the authentication key to the processing unit in encrypted form.

Figure 2:
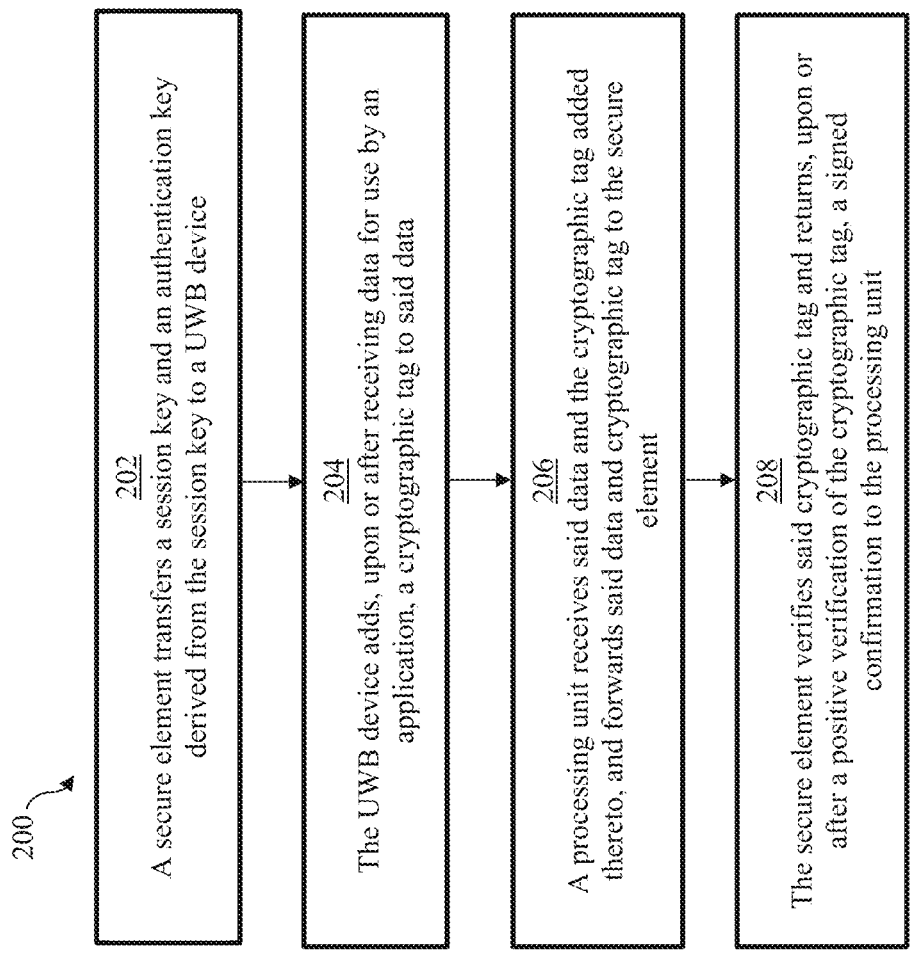
FIG. 2 shows an illustrative embodiment of a method of operating a communication device.

FIG. 2 shows an illustrative embodiment of a method 200 of operating a communication device. At 202, a secure element transfers a session key and an authentication key derived from the session key to a UWB device. Furthermore, at 204, the UWB device adds, upon or after receiving data for use by an application, a cryptographic tag to said data. Furthermore, at 206, a processing unit receives said data and the cryptographic tag added thereto, and forwards said data and cryptographic tag to the secure element. Furthermore, at 208, the secure element verifies said cryptographic tag and returns, upon or after a positive verification of the cryptographic tag, a signed confirmation to the processing unit. This method 200 facilitates increasing the level of security in a ranging system in which a UWB tag, for example a mobile device, performs ranging operations with one or more UWB anchors.

Figure 3:
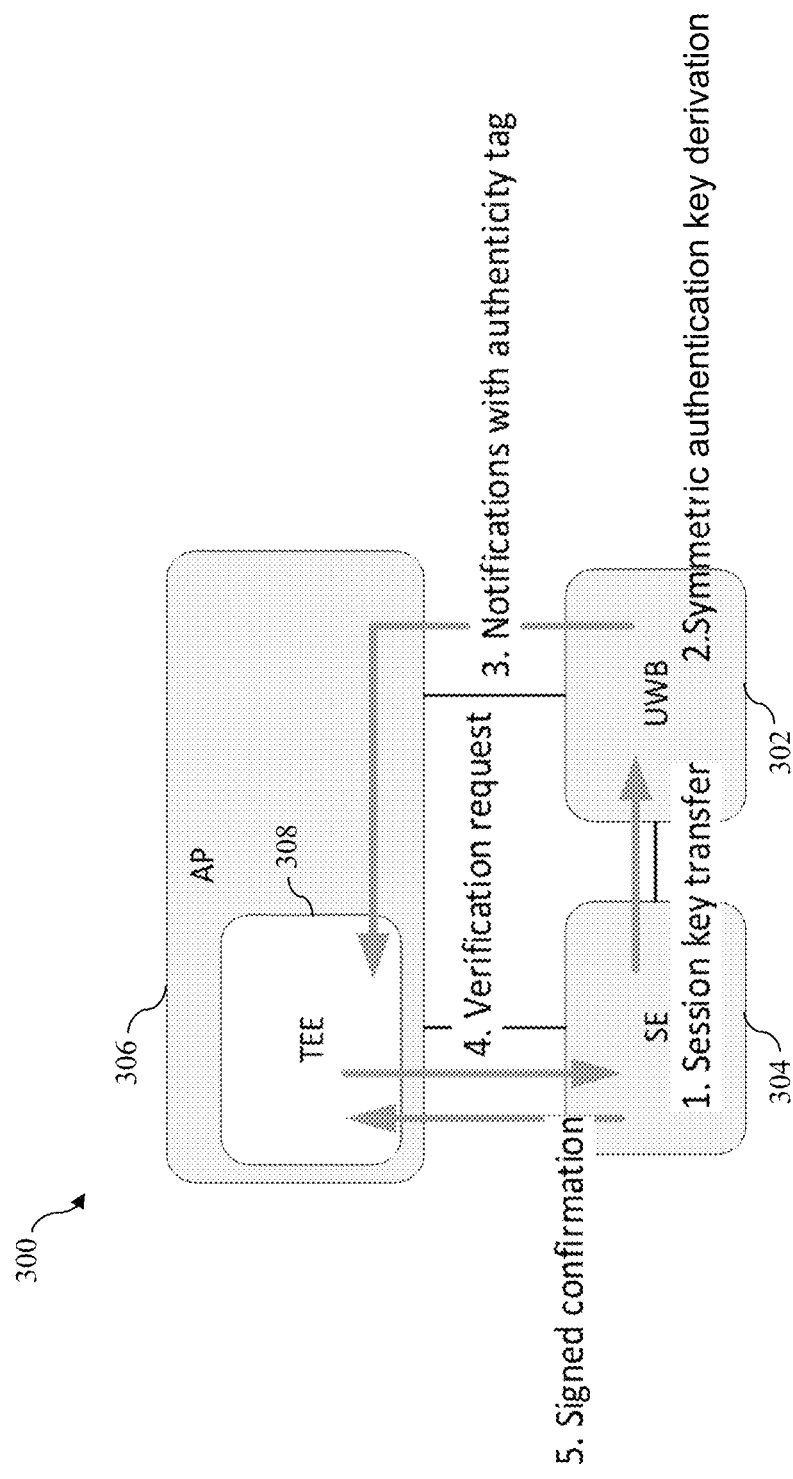
FIG. 3 shows another illustrative embodiment of a communication device.

FIG. 3 shows another illustrative embodiment of a communication device 300. The communication device 300 comprises a UWB device (UWBD) 302, a secure element 304 and an application processor 306. The application processor 306 contains a trusted execution environment (TEE) 308 in which applications can be executed. In operation, the components of the communication device 300 perform the following steps.

1. The secure element 304 transfers a session key to the UWBD 302.

2. During the key derivation step where different keys are derived from the session key for the different functions of UWB ranging, one additional key is derived (i.e., a symmetric authentication key). It is noted that a symmetric authentication key can be processed much faster than an asymmetric one. Also, if an asymmetric authentication key would be used, then a certificate for the public key should be provided as well. Thus, it is advantageous that the authentication key is a symmetric key, but in alternative implementations it might also be an asymmetric key.

3. An authenticity tag (i.e., a cryptographic tag of the kind set forth) is added to a notification by the UWBD 302. This authenticity tag is computed using the authentication key, for example by means of a CMAC or CCM without encryption operation. The notification may include a timestamp or a counter to prevent a replay attack.

4. When an application needs to check the authenticity of the notification, e.g. to trigger a transaction over a Bluetooth low energy (BLE) or any other out of band channel, it forwards the notification to the SE 304 for verification.

5. The SE 304 checks the authenticity tag, and if it is correct it signs a confirmation and returns the signed confirmation to the application executed by the TEE 308.

It is noted that the applet which has generated the session key should keep track of the session identifier and of the correct derived key to perform the step of checking the authenticity tag. Alternatively, a specific service in the SE 304 may perform the checking step. Furthermore, it is noted that the confirmation may be signed using a private cryptographic key stored in the secure element. In that case, the application should have access to a corresponding public cryptographic key to verify the signature, or to a public key of a certificate authority (CA) which can be used to check a certificate (i.e., the signature) provided by the SE 304.

The advantage of this solution is that a signed confirmation can be checked by any entity which has access to the public key of the SE 304. It is noted that in this example the transaction is performed in the TEE 308, but a different mapping might also be possible. For example, the transaction may be performed in the cloud with an application running on the host to perform forwarding of messages from the anchor or anchors via BLE to the cloud. Alternatively, the transaction may be performed in the SE with an application running on the host to perform forwarding of messages from the anchor or anchors. In that case, there are two options. The applet performing the transaction may be the same one as the one which generated the session which performed the transaction, in which the checking can be performed immediately. If the transaction is performed by another applet, then step 4 and 5 may be performed through a serial input/output (SIO) interface, so there is no need for an asymmetric signature to be performed because the internal links between the SE applets are secured against tampering.

Figure 4:
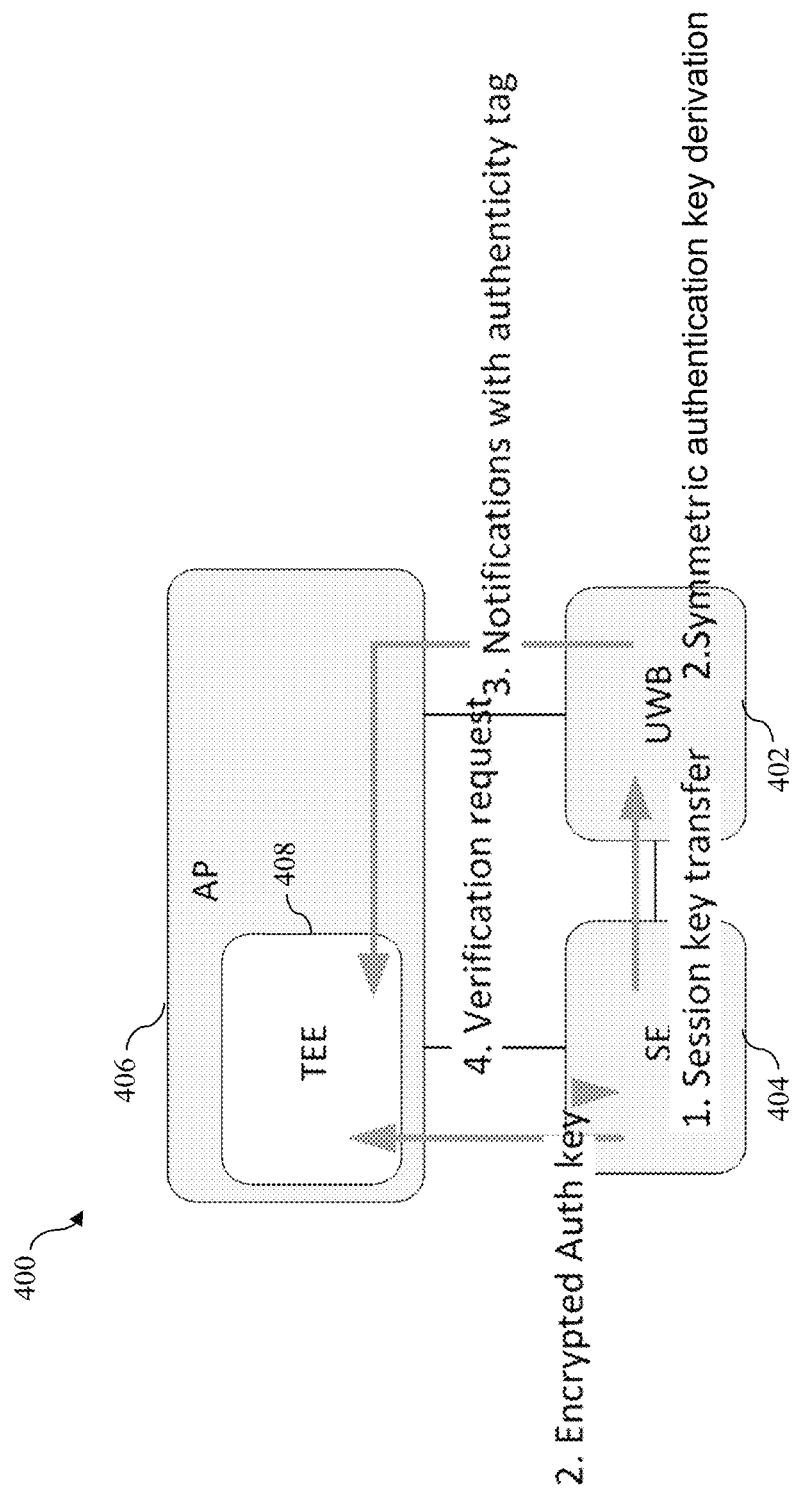
FIG. 4 shows a further illustrative embodiment of a communication device.

FIG. 4 shows a further illustrative embodiment of a communication device 400. In particular, a possible implementation is shown of the embodiment that represents an alternative solution to the technical problem of how to increase the level of security in a ranging system in which a UWB tag performs ranging operations with one or more UWB anchors. In this example of the alternative solution, the SE 404 transmits the encrypted authentication key to the TEE 408 (or to another entity performing the transaction) at the same time it transmits the session key to the UWBD 402. In this implementation, the TEE 408 should have the capability to store securely either a symmetric key pair, e.g. to open a secure channel with the SE 404, or an asymmetric key pair and a certificate to receive the encrypted authentication key.

Figure 5:
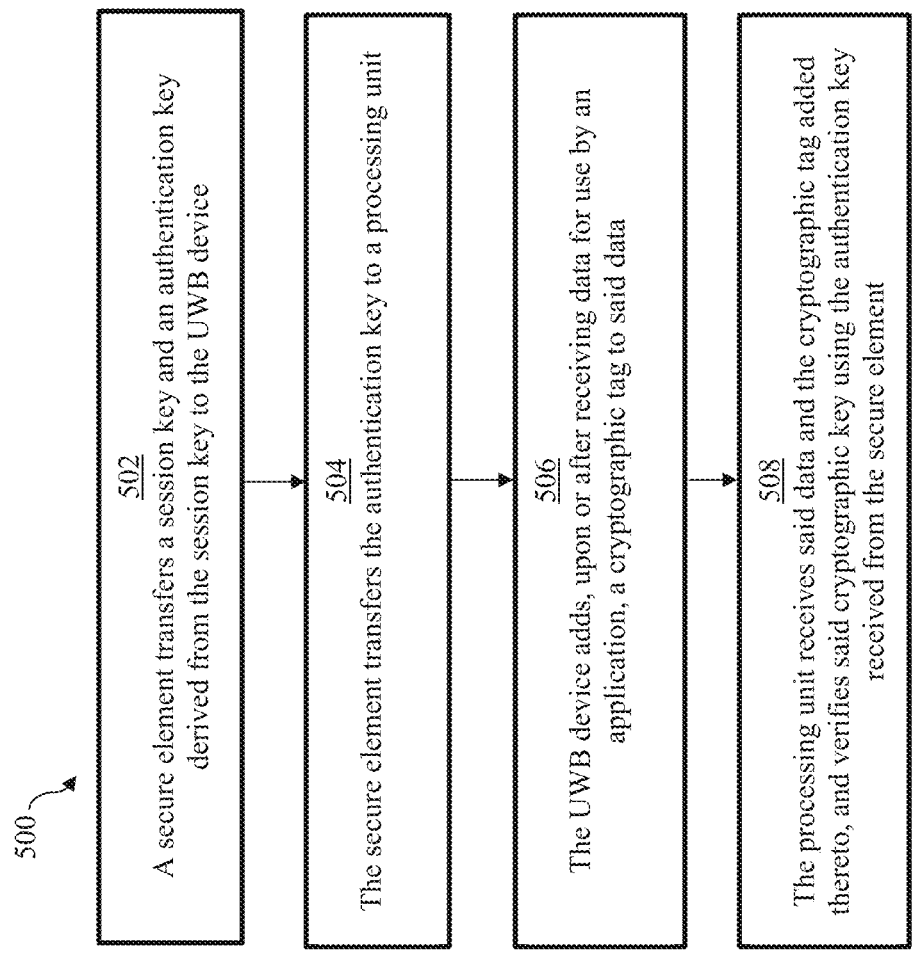
FIG. 5 shows a another illustrative embodiment of a method of operating a communication device.

FIG. 5 shows another illustrative embodiment of a method 500 of operating a communication device. In particular, an operating method 500 is shown which corresponds to the embodiment that represents an alternative solution to the technical problem of how to increase the level of security in a ranging system in which a UWB tag performs ranging operations with one or more UWB anchors. The method 500 comprises the following steps. At 502, a secure element transfers a session key and an authentication key derived from the session key to the UWB device. Furthermore, at 504, the secure element transfers the authentication key to a processing unit. Furthermore, at 506, the UWB device adds, upon or after receiving data for use by an application, a cryptographic tag to said data. Furthermore, at 508, the processing unit receives said data and the cryptographic tag added thereto and verifies said cryptographic key using the authentication key received from the secure element.

Figure 6:
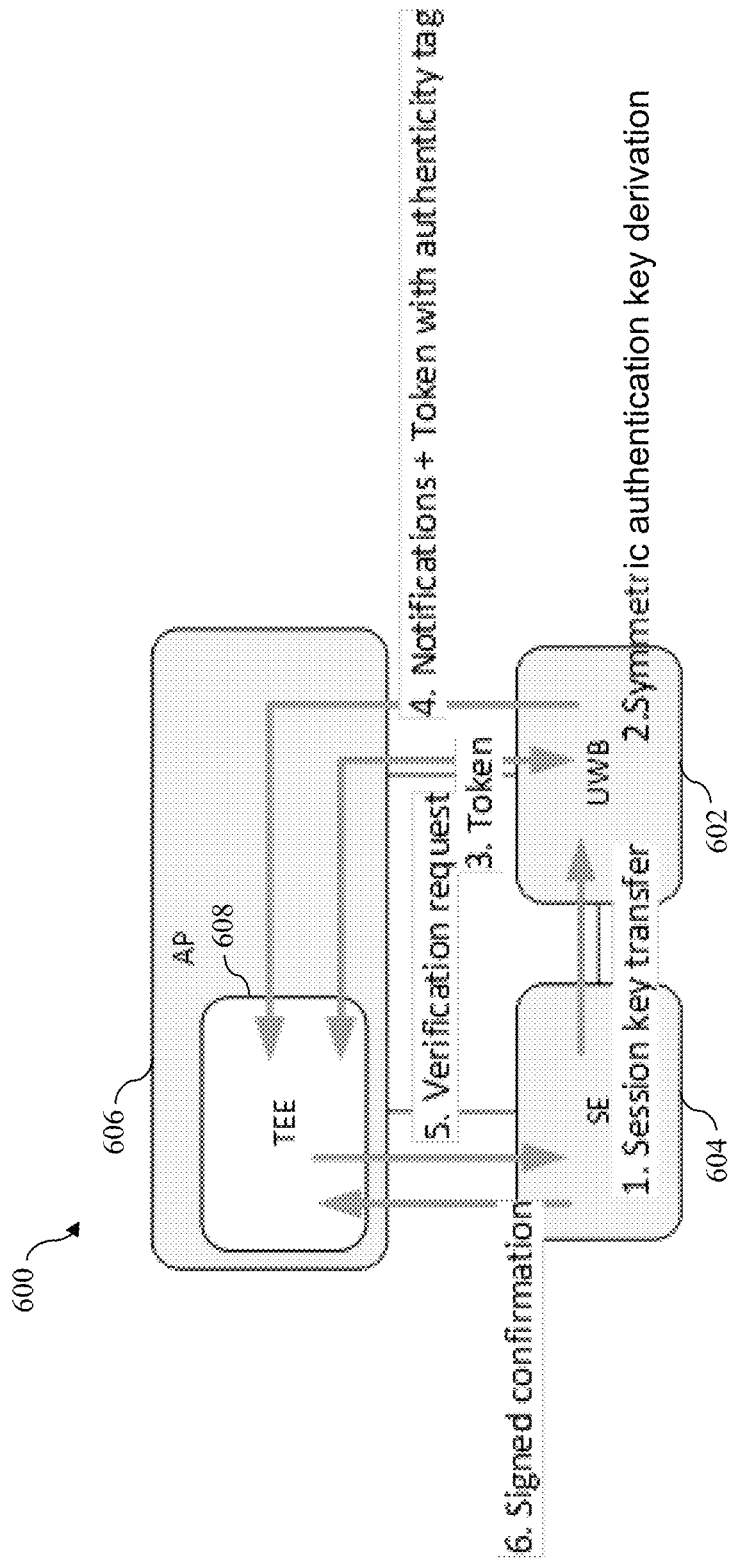
FIG. 6 shows a further illustrative embodiment of a communication device.

FIG. 6 shows a further illustrative embodiment of a communication device 600. In particular, an embodiment is shown in which the cryptographic tag (i.e., the authenticity tag) is based on the notification and a token. More specifically, tokens may be inserted to prevent notifications of being delayed by an attacker. The TEE 608 may regularly send a token to the UWBD 602, which is added to the notification and which is to be included in the data whose authenticity is protected by the authenticity tag. In this way, the TEE 608 may be assured that notifications have been generated after the random token has been transmitted to the UWBD 602.

The presently disclosed communication devices and corresponding operating methods may provide the following advantages. The processing load on the UBW device may be reduced, because a cryptographic tag may be computed relatively quickly, which facilitates tagging every ranging notification (e.g., every few tens of milliseconds). For example, a CMAC may be calculated relatively quickly. Furthermore, the verification of notifications may be performed on ad-hoc basis by any unit which can request access to a secure element, without the need to establish a secure channel with the secure element. In addition, a signed confirmation may be checked later by any entity which has access to secure element's public key or the public key of the certificate authority which signed the SE certificate. This allows for transactions to be confirmed in case of an audit.

In contrast, if the UWB device would generate an asymmetric signature of the notifications, then the processing load would be higher. More specifically, asymmetric cryptography requires heavy processing, typically millions of cycles whereas symmetric cryptography requires hundreds of cycles. Since the UWB device can generate notifications every few tens of milliseconds for multiple sessions, asymmetric cryptography will most likely not be a suitable choice. Furthermore, in that case, the UWB device would need to be provisioned with an asymmetric key pair and a certificate. This could be a hardwired key and certificate, but then these would need to be protected for the lifetime of the UWB device. Alternatively, these could be transferred with the session key by the secure element, but then this would require additional transfers for key and certificates.

The skilled person will appreciate that the authentication key may be generated using any key derivation function. For example, the key derivation function as standardized by the FiRa Consortium may be used for this purpose, or the NIST 800-108 standard published as the NIST Special Publication 800-108, titled Recommendation for Key Derivation Using Pseudorandom Functions. It is noted that the latter standard defines a key derivation function as a function that, with the input of a cryptographic key and other data, generates a binary string, called keying material. Furthermore, the keying material is defined as a binary string, such that any non-overlapping segments of the string with the required lengths can be used as symmetric cryptographic keys. In the present case, one additional key may be computed from the session key. This additional key (i.e., authentication key) will be used to generate a cryptographic tag, for example a CMAC for every notification sent by the UWB device to the application processor. Accordingly, from the session key multiple keys can be generated based on a key derivation method as described in a standard such as NIST800-108, and one these multiple keys may be used as the aforementioned authentication key. More specifically, a key can be derived which is the same for the duration of the session or a key which will rotate regularly during the session. In the first case, the derivation data is a constant, in the second case, its derivation data will vary, e.g. by including a counter known by all parties involved. In the present case a CMAC is computed over the session key and a constant.

It is noted that the notification may include one or more timestamps or a monotonic counter to offer protection against replay and reordering of the notifications. The secure element which generates the session key may also generate the authentication key. Then, when the secure element receives a request to verify a notification and its authenticity tag, then it may rely on this key. If the tag is correct, the secure element may sign the message with its private key, so any entity having access to a corresponding public key can check the notification authenticity (e.g. via an attached certificate). The authenticity check performed in the secure element may either be carried out by any of the applets stored therein, or by a central service which keeps track of the different sessions and of their authentication keys.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 UWB device
104 secure element
106 processing unit
200 method of operating a communication device
202 a secure element transfers a session key and an authentication key derived from the session key to a UWB device
204 the UWB device adds, upon or after receiving data for use by an application, a cryptographic tag to said data
206 a processing unit receives said data and the cryptographic tag added thereto, and forwards said data and cryptographic tag to the secure element
208 The secure element verifies said cryptographic tag and returns, upon or after a positive verification of the cryptographic tag, a signed confirmation to the processing unit
300 communication device
302 UWB device
304 secure element
306 application processor
308 trusted execution environment
400 communication device
402 UWB device
404 secure element
406 application processor
408 trusted execution environment
500 method of operating a communication device
502 a secure element transfers a session key and an authentication key derived from the session key to the UWB device
504 the secure element transfers the authentication key to a processing unit
506 the UWB device adds, upon or after receiving data for use by an application, a cryptographic tag to said data
508 the processing unit receives said data and the cryptographic tag added thereto, and verifies said cryptographic key using the authentication key received from the secure element
600 communication device
602 UWB device
604 secure element
606 application processor
608 trusted execution environment

The invention claimed is:

1. A communication device, comprising:
an ultra-wideband, UWB, device configured to establish a communication session with an external communication device, wherein during the communication session, the UWB device is configured to receive, from the external communication device, data that includes one or more notifications relating to ranging operations performed during the communication session;
a secure element configured to generate at least one session key for use in said communication session and at least one authentication key derived from said session key; and
a processing unit configured to execute an application that uses the data;
wherein the secure element is further configured to transfer the session key and the authentication key to the UWB device;
wherein the UWB device is configured to generate, upon or after receiving the data for use by said application, a cryptographic tag using the data and the authentication key, and to add the cryptographic tag to said data;
wherein the processing unit is configured to receive said data and the cryptographic tag from the UWB device, and to forward said data and cryptographic tag to the secure element;
wherein the secure element is configured to verify said cryptographic tag received from the processing unit, and to return, upon or after a positive verification of the cryptographic tag, a signed confirmation to the processing unit.

2. The communication device of claim 1, wherein the UWB device is configured to generate said cryptographic tag using the authentication key received from the secure element.

3. The communication device of claim 2, wherein the UWB device is configured to generate the cryptographic tag by performing a cipher-based message authentication code (CMAC) operation on the data, wherein said authentication key is used as input for the CMAC operation, or by performing a message authentication code operation based on hash function (HMAC) on the data, wherein said authentication key is used as input for the HMAC operation.

4. The communication device of claim 1, wherein the secure element is configured to sign the confirmation using a private asymmetric cryptographic key.

5. The communication device of claim 4, wherein the processing unit is configured to verify, using a certificate included in the confirmation, a public cryptographic key that forms a key pair with the private cryptographic key.

6. The communication device of claim 1, wherein the processing unit is configured to send one or more randomly generated tokens to the UWB device, and wherein the UWB device is configured to add said tokens to the data and to generate the cryptographic tag based on the data and said tokens.

7. A communication device, comprising:
an ultra-wideband, UWB, device configured to establish a communication session with an external communication device, wherein during the communication session, the UWB device is configured to receive, from the external communication device, data that includes one or more notifications relating to ranging operations performed during the communication session;
a secure element configured to generate at least one session key for use in said communication session and at least one authentication key derived from said session key; and
a processing unit configured to execute an application that uses the data;
wherein the secure element is further configured to transfer the session key and the authentication key to the UWB device;
wherein the secure element is further configured to transfer the authentication key to the processing unit;
wherein the UWB device is configured to generate, upon or after receiving the data for use by said application, a cryptographic tag using the data and the authentication key, and to add the cryptographic tag to said data;
wherein the processing unit is configured to receive said data and the cryptographic tag from the UWB device, and to verify said cryptographic tag using the authentication key received from the secure element.

8. The communication device of claim 7, wherein the secure element is configured to transfer the authentication key to the processing unit in encrypted form, such that the confidentiality, integrity and authenticity of the authentication key are protected.

9. A method of operating a communication device, the communication device comprising an ultra-wideband, UWB, device for establishing a communication session with an external communication device, a secure element for generating at least one session key for use in said communication session and at least one authentication key derived from said session key, and a processing unit for executing an application that uses data that includes one or more notifications relating to ranging operations performed during the communication session, the method comprising:
transferring, by the secure element, the session key and the authentication key to the UWB device;
receiving, by the UWB device, the data from the external communication device;
generating, by the UWB device, upon or after receiving the data for use by said application, a cryptographic tag using the data and the authentication key, and adding the cryptographic tag to said data;
receiving, by the processing unit, said data and the cryptographic tag from the UWB device, and forwarding said data and cryptographic tag to the secure element; and
verifying, by the secure element, said cryptographic tag received from the processing unit, and returning, upon or after a positive verification of the cryptographic tag, a signed confirmation to the processing unit.

10. The method of claim 9, wherein the UWB device generates said cryptographic tag using the authentication key received from the secure element.

11. The method of claim 10, wherein the UWB device generates the cryptographic tag by performing a cipher-based message authentication code (CMAC) operation on the data, wherein said authentication key is used as input for the CMAC operation, or by performing a message authentication code operation based on hash function (HMAC) on the data, wherein said authentication key is used as input for the HMAC operation.

12. The method of claim 9, further comprising a computer program comprising executable instructions stored in a non-transitory computer-readable medium which, when executed by a communication device, causes said communication device to carry out the method.

13. A method of operating a communication device, the communication device comprising an ultra-wideband, UWB, device for establishing a communication session with an external communication device, a secure element for generating at least one session key for use in said communication session and at least one authentication key derived from said session key, and a processing unit for executing an application that uses data that includes one or more notifications relating to ranging operations performed during the communication session, the method comprising:
- transferring, by the secure element, the session key and the authentication key to the UWB device;
- transferring, by the secure element, the authentication key to the processing unit;
- receiving, by the UWB device, the data from the external communication device;
- generating, by the UWB device, upon or after receiving the data for use by said application, a cryptographic tag using the data and the authentication key, and adding the cryptographic tag to said data; and
- receiving by, the processing unit, said data and the cryptographic tag from the UWB device, and verifying said cryptographic tag using the authentication key received from the secure element.

14. The method of claim 13, wherein the secure element transfers the authentication key to the processing unit in encrypted form, such that the confidentiality, integrity and authenticity of the authentication key are protected.

15. The method of claim 13, further comprising a computer program comprising executable instructions stored in a non-transitory computer-readable medium which, when executed by a communication device, cause said communication device to carry out the method.

* * * * *